United States Patent [19]

Logie et al.

[11] Patent Number: 4,480,208

[45] Date of Patent: Oct. 30, 1984

[54] STATOR STRUCTURE FOR AN ELECTROMAGNETIC DEVICE

[75] Inventors: Frank M. Logie, London; Ronald Phillips, Northolt, both of England

[73] Assignee: Lucas Industries Public Limited Company, Birmingham, England

[21] Appl. No.: 430,673

[22] Filed: Sep. 30, 1982

[30] Foreign Application Priority Data

Oct. 23, 1981 [GB] United Kingdom ................ 8132015

[51] Int. Cl.[3] ................................ H02K 1/18

[52] U.S. Cl. ................................ 310/194; 310/216; 310/71; 310/254

[58] Field of Search .................. 310/194, 42, 216–218, 310/254, 259, 258, 71, 67

[56] References Cited

U.S. PATENT DOCUMENTS

| | | | |
|---|---|---|---|
| 3,153,157 | 10/1964 | Rabe | 310/194 X |
| 3,189,772 | 6/1965 | Wingler et al. | 310/194 X |
| 3,453,466 | 7/1969 | Olson | 310/67 |
| 3,719,840 | 3/1973 | Burckhardt et al. | 310/71 |
| 3,912,955 | 10/1978 | Simpson | 310/216 X |

*Primary Examiner*—Donovan F. Duggan

[57] ABSTRACT

A stator structure for an electromagnetic device includes a core of cylindrical form having pole pieces between which are defined grooves accommodating windings. The core is formed with a diametrical slot which extends the length of the core and which locates the connections between adjacent windings.

3 Claims, 4 Drawing Figures

STATOR STRUCTURE FOR AN ELECTROMAGNETIC DEVICE

This invention relates to a stator structure for an electromagnetic device which includes a hollow armature surrounding the stator structure, the stator structure including a core of cylindrical form having a plurality of circumferential grooves defined therein, adjacent grooves defining a pole piece therebetween, and windings located in the grooves, the direction of electric current flow in the adjacent windings in use, being in the opposite direction so that adjacent pole pieces will assume opposite magnetic polarity.

In order to achieve the opposite current flow direction in adjacent windings it is the usual practice to wind the adjacent windings in series and in the opposite direction. When one winding has been wound the last turn appears at the outer surface of the winding and the wire must then be passed to the adjacent groove. This has been achieved by providing a radial slot in the pole piece through which the wire is passed. If the slot is less than the depth of the groove the wire passes adjacent the side wall of the pole piece to the base of the adjacent groove. The winding of the new winding takes place in the opposite direction and the connecting portion of the winding which passes down the side wall is subject to considerable stress during the winding operation as the turns of the new winding are wound. Moreover, it occupies some of the space in the groove which could be occupied by the winding. In order to minimise this stress and also avoid the loss of space, it has been proposed to ensure that the slot extends to the full depth of the grooves. With this arrangement the connecting portion of the wire can be located in the slot so that it is not contacted by the turns of the new winding and also does not occupy winding space. However, unless great care is exercised during the winding of the first few turns of the new winding the connecting portion will not remain in the slot.

The object of the present invention is to provide a stator structure of the kind specified in a simple and convenient form.

According to the invention in a stator structure of the kind specified the core is provided with a diametrical slot throughout its length, said diametrical slot serving to accommodate the connections between the windings.

Reference will now be made to the accompanying drawings in which.

Figure 1:
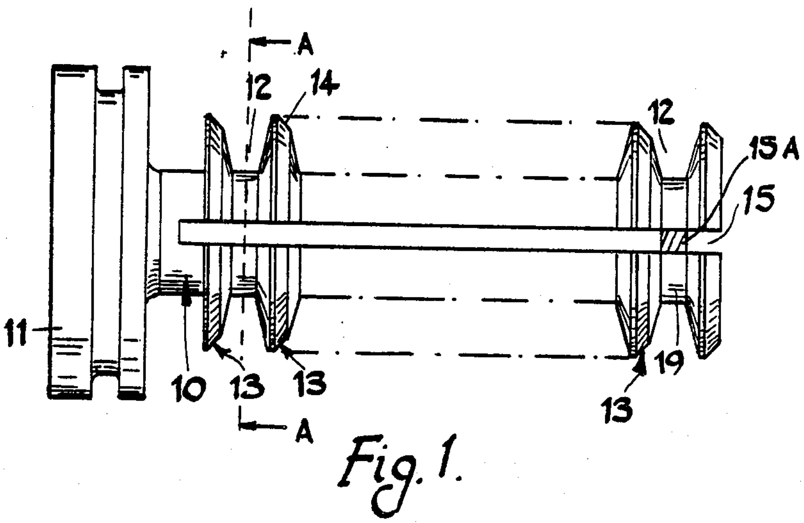
FIG. 1 is a side elevation of a stator structure.
Figure 2:
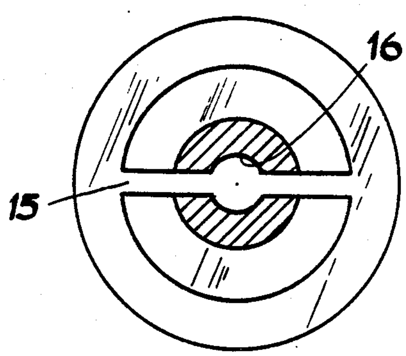
FIG. 2 is a cross-section on the line A—A of FIG. 1.

In FIG. 1 there is illustrated an unwound core of a stator structure of an electromagnetic device in accordance with the invention. The stator structure is of generally cylindrical form and includes a main portion 10 which is provided with an integral mounting 11. The main portion 10 is formed by machining a bar of larger diameter to provide a series of circumferential grooves 12. Adjacent grooves define pole pieces 13 which in the particular example, have an equal overall diameter. The pole pieces are machined to a special section which includes faces 14 which form pole faces.

The grooves 12 have windings 17 (FIGS. 3 and 4), wound therein and conveniently the windings are connected in series and are wound from a single piece of wire. Adjacent windings are wound in the opposite direction so that when electric current is passed through the windings the direction of electric current flow in the windings in adjacent grooves will be in the opposite direction so that adjacent pole pieces will assume opposite magnetic polarity.

The device includes an armature 9 which is of hollow cylindrical form but which has on its internal peripheral surface, pole pieces 8 which define pole faces complementary to the faces 14. In order to permit assembly of the armature about the stator structure, the armature can be divided along its length to enable the resulting pieces to be located about the stator structure. In use, when electric current is passed through the windings the pole faces will be magnetized and the magnetic flux will cause an axial force to be developed on the armature to move the armature relative to the stator structure.

As mentioned above the windings are conveniently wound from a single piece of wire so that one winding is first wound in one direction and the wire passed from the outer surface of the wound winding to the base wall of the adjacent groove so that winding can proceed in the opposite direction. It is necessary for the connecting portion of the wire to pass over the intervening pole piece in such a manner that it does not interfere with the operation of the device. As mentioned above and as shown in FIG. 3, it is known to form a radial slot 18 in the pole piece to permit the connecting portion to pass therethrough.

Figure 3:
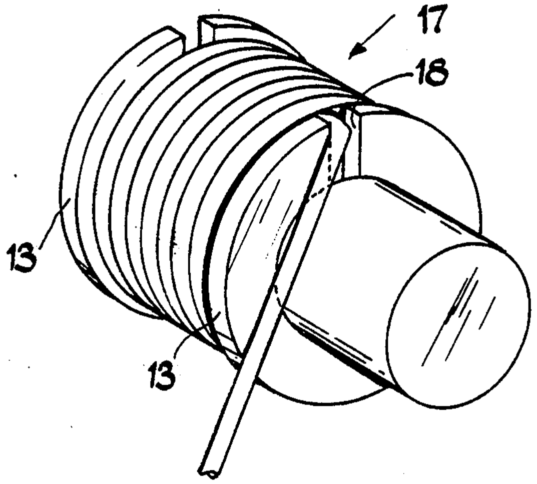
FIG. 3 is a perspective view showing a known winding method.

However, unless the first few turns and possibly the first two layers of the next winding are wound slowly with the connecting portion of the wire being held in the slot 18 there will be a tendency as shown in FIG. 3 for the connecting portion of the wire to be pulled partly out of the slot due to the tension in the wire. As a result the connecting portion of the wire will occupy winding space besides being subject to stress.

Figure 4:
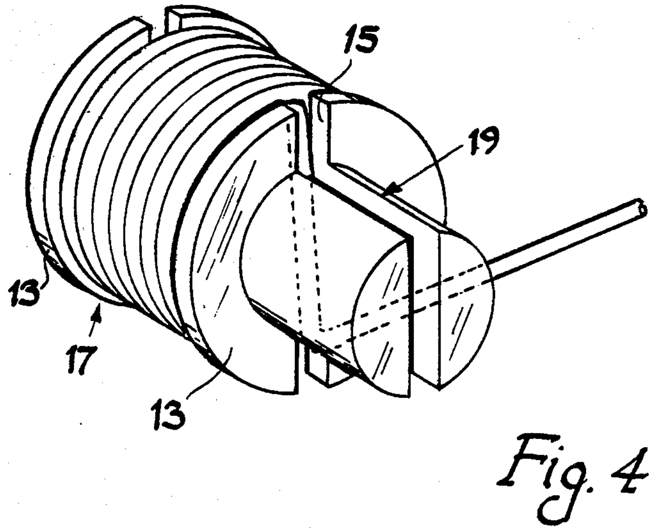
FIG. 4 is a view similar to FIG. 3 of the winding method in accordance with the invention.

In order to overcome this problem is it proposed to form the stator structure with a diametrically disposed longitudinally extending slot 15, the slot extending over that portion of the stator which mounts windings. When one winding is complete the wire is passed through the slot 15 to the adjacent groove and winding recommences. With this arrangement and as shown in FIG. 4, the tension in the wire retains the wire adjacent the root portion 19 of the groove.

The portions of the stator structure which are engaged by the wire may be coated with an insulating material to further minimise the risk of damage to the wire. The coating does not extend to the pole faces 14 and if the coating is provided by a spraying operation then these must either be protected during the application of the insulation material or the material must subsequently be removed from the faces.

In the winding of the stator structure the wire will be subject to a winding tension which because of the slot 15, will tend to close the slot as winding takes place. In order to minimise this difficulty the slot during the winding operation may be occupied by a suitable spacer member which is progressively removed as the winding of each winding is completed. Alternatively individual spacer members 15A can be inserted into the slot prior to the winding of the wire in the groove but after the wire has been passed from the adjacent winding through the slot 15. When the stator structure has been wound it can be arranged that the ends of the windings extend from the same end of the stator structure by passing the appropriate end of the winding through a central bore 16 which is provided in the stator structure or by winding a final layer on each winding so that the ends of the wire lie at the same end of the stator structure.

The technique described can be applied to a device in which the pole pieces 13 are of varying diameter along the length of the device and also to a device in which the pole pieces and the root portions of the grooves are of non-circular section for example, square section.

In some instances it may be required to pass an axially movable rod through the central bore 16, the rod being connected to the armature. The connecting portions of the windings must therefore be shaped to lie adjacent the surface of the bore and this can be achieved during the winding operation using a shaped rod which once the connecting portion has been passed through the groove 15 is utilized to displace the intermediate part of the connecting portion so that it lies adjacent the surface of the bore.

I claim:

1. A stator structure for an electromagnetic device comprising: a core of cylindrical form having a plurality of circumferential grooves defined therein, adjacent grooves defining a pole piece therebetween, windings located in the grooves, the direction of electric current flow in the adjacent windings in use, being in the opposite direction so that adjacent pole pieces will assume opposite magnetic polarity, and a slot extending diametrically across the core throughout its length with winding wire extending from one winding to an adjacent winding across a pole piece to connect adjacent windings extending through the core via said slot so that adjacent windings can be wound sequentially without the wire occupying space in the grooves as it traverses a pole piece and a connecting wire is not located in a groove as it traverses a pole piece.

2. A stator structure according to claim 1, including an axial bore formed in the core, the connections between the windings including curved portions disposed adjacent the wall of the bore.

3. A stator structure according to claim 1 or 2 including spacer members located in said slot to maintain the dimension of said slot.

* * * * *